June 12, 1956   W. A. TAYLOR   2,750,037
GRAIN SAVING DEVICE FOR COMBINES
Filed Nov. 8, 1952   3 Sheets-Sheet 1

Inventor:
WENDELL A. TAYLOR,
Attorneys.

June 12, 1956 W. A. TAYLOR 2,750,037
GRAIN SAVING DEVICE FOR COMBINES
Filed Nov. 8, 1952 3 Sheets-Sheet 2
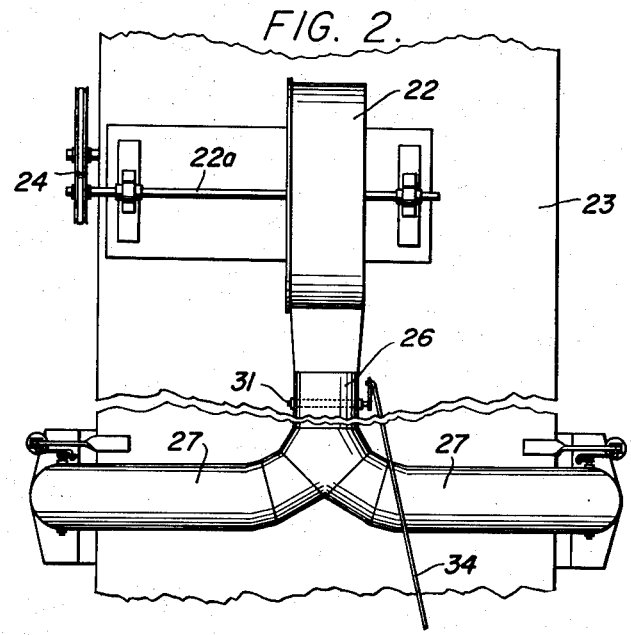
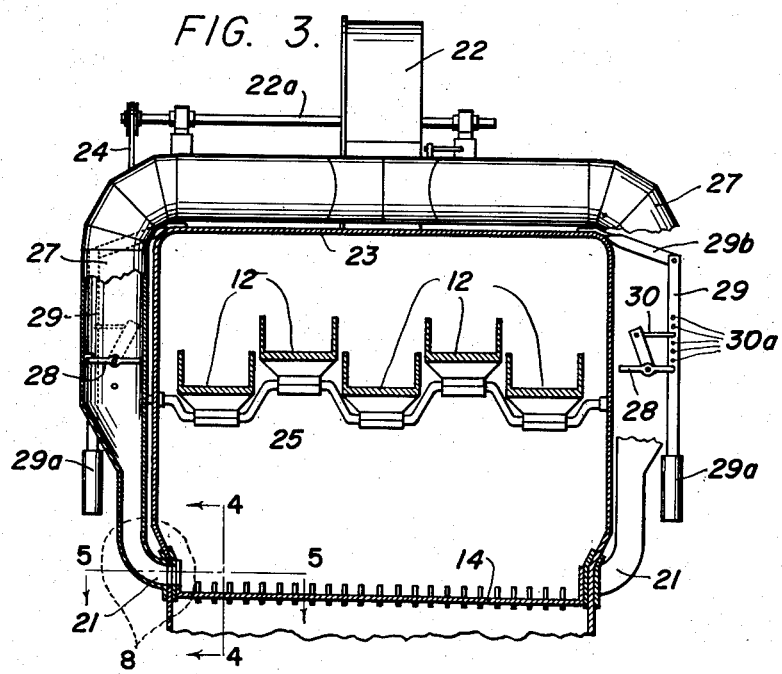
Inventor:
WENDELL A. TAYLOR,
Attorneys.

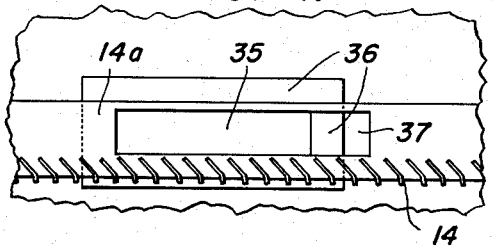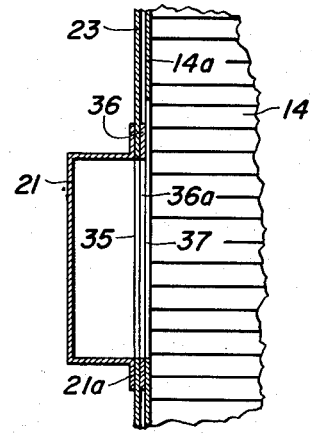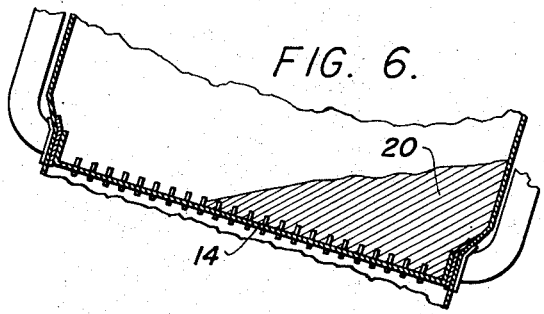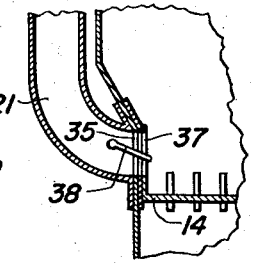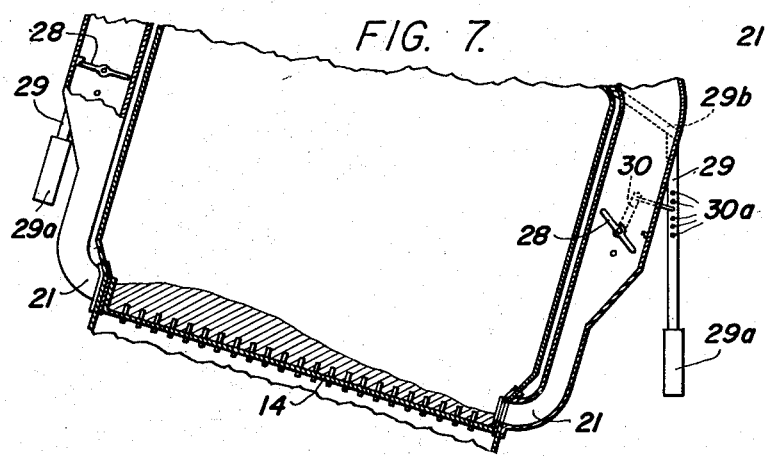

United States Patent Office 2,750,037
Patented June 12, 1956

2,750,037

GRAIN SAVING DEVICE FOR COMBINES

Wendell A. Taylor, Malad City, Idaho

Application November 8, 1952, Serial No. 319,476

10 Claims. (Cl. 209—261)

This invention relates to agricultural combines, as used for the combined harvesting and threshing of grain and other seed crops standing in the field. It relates particularly to combine construction and attachments, which enable operation on a hillside or other sloping terrain without loss of the threshed kernels of grain.

Agricultural combines are complicated and expensive machines. They have been brought to a high state of perfection over a period of years. When working on flat terrain, they operate very effectively and generally produce highly satisfactory results. When, however, they are used on sloping terrain, such as is often found in the western part of the United States in connection with so-called dry farming operations, they lose a very high percentage of the harvested and threshed kernels of grain by failure of such kernels to pass through the chaffer or cleaning sieves. I have found that the grain loss is often as high as 85%.

In order to compensate for sidewise slant of the machine as is traverses the sloping terrain, and thereby prevent the grain loss mentioned above, manufacturers of combines presently offer machines equipped with complicated leveling mechanism, which adds considerably to the original cost and expense of maintenance of the equipment. Many farmers accept, of necessity, the high grain loss, because they cannot afford the extra cost entailed by this leveling equipment.

In working to overcome this problem of excessive grain loss on the sloping terrain of dry farming operations near Malad, Idaho, I conceived the idea of forcibly maintaining substantially normal distribution of the chaff and grain mixture along the width of its path of travel through the machine, by means of laterally applied streams of air, to achieve a condition substantially similar to that which would be the case were the machine level.

I have found, in practice, that very effective results can be achieved by directing a stream of air across the path of travel of the chaff and grain mixture, from the low side thereof toward the high and at a forwardly disposed location with respect to the grain sieves. Best results are normally obtained when the stream of air extends a limited distance along the length of the sieve at the forward end thereof, though effective grain savings have been made with the air stream located in advance of the sieves.

From a structural standpoint, I provide apparatus made up of a system of air conduits and discharge nozzles, the latter being positioned at respectively opposite sides of the machine, laterally of the path of travel of the chaff and grain mixture through the machine and directed for discharge across such path at an appropriate location forwardly with respect to the chaffer sieves. Means are provided for blowing air through the air conduits, as well as means for regulating discharge through the respective nozzles in accordance with the sidewise slope of the machine at any given time during its travel.

Preferred forms of the apparatus embody a main air-flow conduit leading from the discharge of an air blower and branching to mutually opposite sides of the machine. A valve controlled by a pendulous actuator is positioned in each of the branch conduits, for regulating the supply of air to respective discharge nozzles in accordance with the degree of sidewise slant of the machine during its travel through the grain field. Thus, when the machine is riding level, there will preferably be no discharge of air from either nozzle, but, should the machine travel along a hillside, a stream of air of appropriate force will be automatically discharged across the path of travel of the chaff and grain mixture from the low side of the machine toward the high side. Undesirable piling of such chaff and grain mixture along the low side of its path of travel, as would take place ordinarily, is prevented, and the mixture is forcibly spread substantially uniformly over the chaffer sieves, for at least the most important initial portion of its travel, so that the grain is given adequate opportunity to drop through the sieves.

Besides the important function of distributing the chaff and grain mixture across the width of the sieves, it appears that these transverse air streams also exercise a beneficial effect, in connection with hillside operation, in combination with the usual upwardly directed air streams through the sieves, to establish an unusual turbulence adjacent the working surfaces of the sieves, which aids materially in separating the chaff from the grain during the redistribution of the mixture across the width of its path of travel through the machine. I have found, however, that it is not ordinarily desirable to utilize such air streams during operation on the level, for, unless the force thereof is very carefully controlled relative to the normal upwardly-directed air flow, undesirable side-wise piling of the chaff and grain mixture is almost inevitable.

The grain-saving mechanism which I have designed may be built into a combine as original equipment, but will probably be utilized in the great majority of instances as a separable attachment representing optional equipment.

From the above, it can be seen that the principal objective of my invention is to provide simple, economical, and positive equipment in combination with a conventional agricultural combine, for preventing undue loss of grain when the combine is operated on a hillside or other sloping terrain.

It can also be seen that an outstanding feature of the invention is the provision of means for the controlled establishment of transversely-directed streams of forced air at opposite sides of and across the normal path of grain travel, longitudinally, through the machine.

Additional objects and features of the invention will become apparent from the following detailed description of those presently preferred embodiments which are illustrated, by way of example, in the accompanying drawings.

In the drawings:

Fig. 1 represents a fragmentary perspective view, largely diagrammatic in character, of one conventional type of agricultural combine equipped with the grain-saving attachment of the invention, the platform feeder, or grain cutting and harvesting portion, being broken away for convenience of illustration, and portions of the side walls of the intermediate portion of the machine being broken out to reveal how the apparatus of the invention ties in with the combine proper;

Fig. 2 is a fragmentary top plan;

Fig. 3 is a transverse vertical section taken on the line 3—3 of Fig. 1, showing certain background parts in elevation, with portions broken away to reveal otherwise hidden control structures;

Fig. 4 is a fragmentary, longitudinal, vertical section taken on the line 4—4 of Fig. 3, and drawn to a somewhat enlarged scale;

Fig. 5 is a fragmentary horizontal section taken along the line 5—5 of Fig. 3, and drawn to the same scale as Fig. 4;

Fig. 6 is a diagrammatic representation of conditions within the combine during hillside operation, with the apparatus of the invention idle;

Fig. 7 is a view corresponding to that of Fig. 6, but showing conditions when the apparatus of the invention is in operation; and Fig. 8 is a view corresponding to the lower left hand portion of Fig. 3, but drawn to the enlarged scale of Figs. 4 and 5, and illustrating an optional, additional feature.

Figure 1:
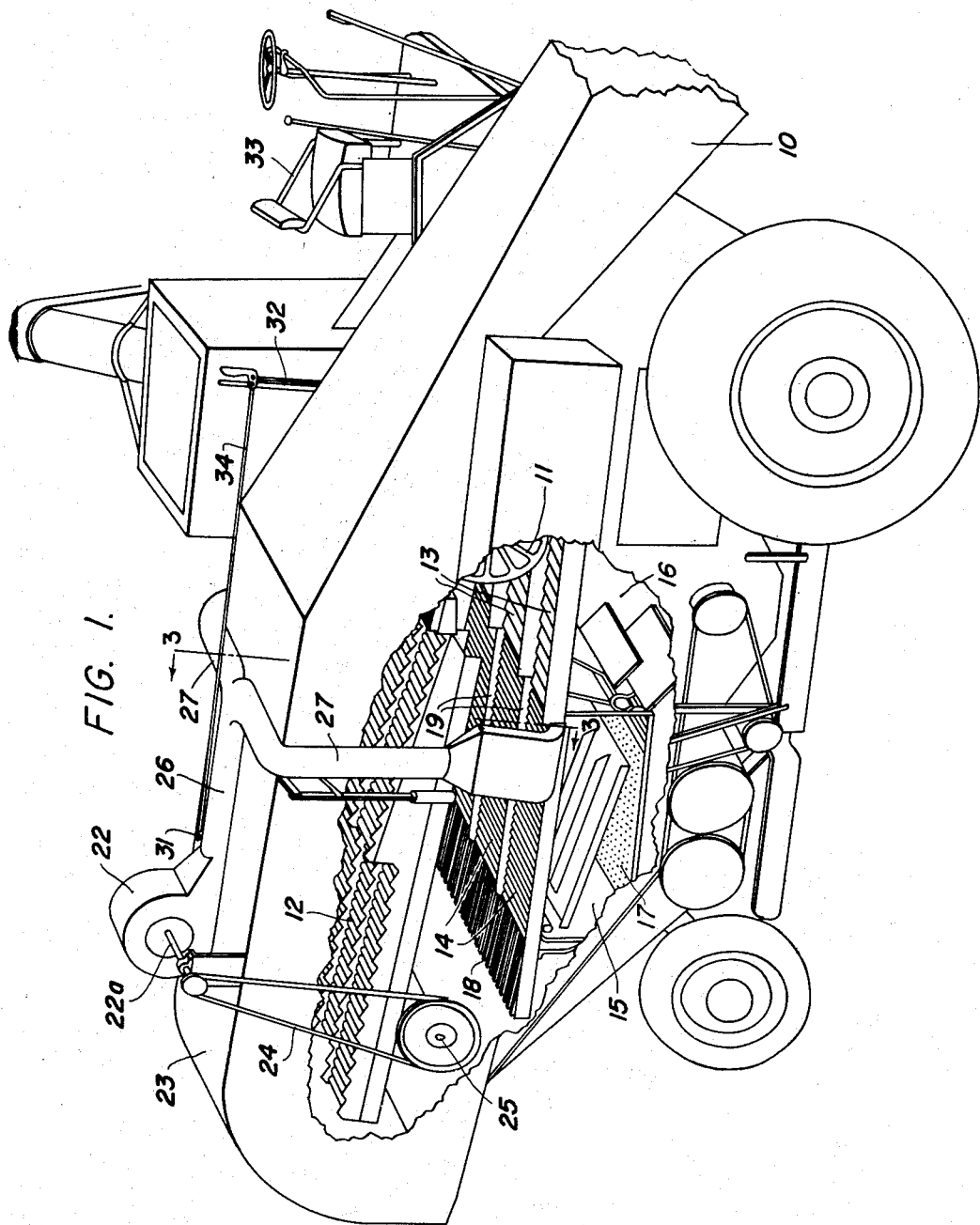

Referring to the drawings:

The combine of Fig. 1 embodies, at its extreme forward portion, a customary platform feeder or grain cutter and harvester (not shown) leading into elevating mechanism, which is disposed within a forward housing portion 10 and is arranged to discharge the cut and elevated stalks of grain into the usual threshing cylinder 11. Straw is delivered from the threshing cylinder to so-called straw walkers 12, and the mixed chaff and grain is delivered to feeder means, provided in this instance by a grain pan 13, which, in company with chaffer sieves 14, reciprocates in short vibratory strokes for the purpose of conveying the mixture backwardly onto and over the sieves, where it is subjected to the influence of a rising blast of air supplied by way of the grain recovery chamber 15 from a fan chamber 16. The grain normally passes through the chaffer or cleaning sieves 14 onto a second set of sieves 17, while the chaff passes to discharge at 18.

As so constructed, the illustrated combine conforms in general with accepted principles of combine design. The various makes of combines presently on the market differ somewhat in detail, but all embody a structural combination conforming generally with that here illustrated.

I have found in practice that, regardless of the differences in detail between the various makes of combines presently on the market, excessive grain losses occur whenever the machine is operated along a hillside or other sharply sloping terrain that causes the machine to slant sidewise during its grain harvesting and threshing travel.

The condition that ordinarily occurs within the combine as a result of such sidewise sloping travel is illustrated in Fig. 6, where it can be seen that the chaff and grain mixture moving longitudinally along the sieves 14 toward the rear end of the machine slides to the low side of the sieves under the influence of gravity, regardless of the longitudinal partitions 19, forming a deep stream 20 banked up against the low side of the combine housing. The blast of separating air is relatively ineffective on the greater part of this stream 20 of mixed grain and chaff, and only a small percentage of the grain passes through the sieves. I have found that by far the greater part of the grain remains with the chaff, and is discharged to waste therewith over the chaff discharge lip 18.

In accordance with my invention, the combine is equipped with a grain-saving device for hillside operation, comprising a pair of pressure air discharge nozzles at respectively opposite sides of the longitudinal path of travel of the chaff and grain mixture through the machine following its discharge from the threshing cylinder 11, and with slope controlled means for supplying air under pressure to that nozzle which is lowermost during the hillside travel of the combine.

As illustrated in the most preferred embodiment of Figs. 1 through 5, the nozzles 21 are elongate longitudinally of the machine, and are substantially rectangular in cross section in order to direct a broad stream of air of uniform thickness transversely across the flow of chaff and grain mixture. For the purpose of achieving the most effective distribution of the chaff and grain mixture tending to pile up against the lowermost side wall of the combine during hillside travel, I have found it advantageous to locate the nozzles 21 at the forward end of the chaffer or cleaning sieves 14, so that they extend backwardly along the length of such sieves a limited distance. In actual practice on a current model of a standard make of combine constructed in accordance with the showing of Fig. 1, and having chaffer or cleaning sieves four feet in length, nozzles whose discharge orifices are two and one half by twelve inches in size, respectively, have given excellent results.

For supplying the nozzles with air under pressure, I utilize a blower 22, which is advantageously mounted on top of the main housing 23 of the combine and is driven by any suitable drive connection with any convenient rotating shaft of the combine mechanism. As shown, a belt pulley drive indicated generally 24, connects the blower drive shaft 22a with the outwardly protruding end of the straw walker drive shaft 25, so that the blower operates constantly during operation of the combine.

A main air flow conduit 26 connects the output end of the blower 22 with the respective nozzles 21 by means of branch conduits 27, respectively. Thus, the blower is arranged to force pressure air to both sides of the combine.

Since it is desired to have pressure air discharge from only that nozzle which is lowermost during hillside travel of the combine, valve means and control means therefor are provided in operative association with the air flow system. In the illustrated embodiment, a pair of butterfly damper valves, indicated 28, respectively, Fig. 3, are disposed in the respective branch conduits 27, and respective gravity-actuated control mechanisms 29 are associated therewith.

The control mechanisms 29 are of pendulum type, each comprising a pendulum 29a suspended from a bracket arm 29b and adjustably connected to the corresponding butterfly damper valve 28 by actuating linkage 30.

Thus, in hillside operation of the combine, the pendulum 29a at the lowermost side of the machine will swing outwardly, under the influence of gravity, a distance equivalent to the degree of hillside slope, thereby opening its corresponding butterfly damper valve 28 to an equivalent extent, and permitting a thereby regulated stream of pressure air to flow through the corresponding branch conduit 27 and to discharge from the corresponding nozzle 21, all as is indicated in Fig. 7. The valve 28 at the opposite side of the machine remains closed by reason of the gravitational pull on its pendulum being directed inwardly of the machine.

The degree of opening of a butterfly damper valve 28 for any given sidewise slope of the machine may be predetermined by the setting of its actuating linkage 30 with respect to the series of securement holes 30a along the length of the stem or arm of the pendulum 29a.

During travel of the combine over level ground, both valves 28 are closed, as in Fig. 3, rendering the system ineffective to interfere with normal operation. A main butterfly damper valve 31, Figs. 1 and 2, is preferably provided in the main conduit 26, for the purpose of closing off the flow of air to the branch conduits during extended runs over level ground. Such valve 31 is advantageously controlled by means of a manually operated lever 32, Fig. 1, disposed in the vicinity of the driver's seat 33, such operating lever 32 being connected to the valve by means of a linkage rod 34.

It should be noted that, where the combine is equipped with the grain-saving mechanism of the invention and is utilized at any given time only on level terrain, the belt of the blower drive 24 may be removed, so that the equipment is completely out of operation.

In hillside operation of the combine, the effect of my apparatus is graphically depicted by Fig. 7, wherein is indicated, in general, the way in which the stream of pressure air from the low nozzle re-distributes the chaff and grain mixture over substantially the entire width of the chaffer or cleaning sieves 14, despite the slope of the machine. Fig. 6 illustrates the condition which would exist with the apparatus of the invention out of operation. This is the condition normally existent in conventional combines not equipped with the apparatus of the invention, when operating along a hillside or other sloping terrain.

It can be seen from Fig. 7, that the re-distribution of the chaff and grain mixture at the critical forward point of its travel along the length of the chaffer or cleaning sieves 14 effectively exposes such mixture to the separating effect of the normal air blast rising upwardly through the sieves, and permits the grain to pass through the sieves, which is not the case in the sidewise piled condition shown in Fig. 6. The air blast through the nozzle must, of course, not be so great as will unduly alter the effect of gravity on the grain kernels. I have found that the force of this air blast can be easily and nicely regulated to achieve the results sought, and this should be done in any given instance by suitable adjustment of the pendulum control mechanism. In the combination shown, the blower has an effective diameter of approximately eighteen inches, and the air flow conduit a diameter of approximately six inches. This provides excellent results in connection with the blower drive arrangement shown and the nozzle sizes specified hereinbefore. These illustrative dimensions are by no means critical, however, and are set forth here merely as a guide to reproduction of the preferred form being presently considered.

The particular manner in which the nozzles are connected to and open through the side walls of the combine housing may vary in accordance with the structural characteristics of the particular make of combine to which the invention is applied. In the present embodiment, see Figs. 4 and 5, each nozzle 21 terminates in outwardly extending flanges 21a, which are welded or otherwise secured to the outside of housing 23 over and in registry with a nozzle opening 35 provided in the corresponding side wall of the housing. Inasmuch as the grain pan 13 and chaffer sieves 14 reciprocate back and forth during the operation of the combine, it is necessary to provide for this movement in the mounting of the nozzles. As illustrated, an apertured seal plate 36 is interposed in the clearance normally existing between the combine housing and the proximate raised side 14a of the sieves, the aperture or opening 36a thereof corresponding to and registering with the opening 35. Such seal plate 36 is secured to the inner wall face of the combine housing, preferably by welding. The upstanding side wall 14a of the sieves is also apertured to provide a nozzle opening 37, which corresponds to and registers with the openings 35 and 36a, except in length. The nozzle opening 37 is longer than the other two, as shown, and is disposed so that, in the back and forth motion of the chaffer sieves 14, the orifice of nozzle 21 and openings 35 and 36a with which it registers, are always fully open. As shown in Figs. 4 and 5, the chaffer sieves 14 are at the extreme forward point of their reciprocative stroke.

As illustrated, it is preferred that the lower defining wall of each nozzle 21 lie substantially flush with the upper surface of the chaffer sieves. I have found that, in the particular embodiments shown, this insures maximum effectiveness of the streams of pressure air in their action on the piled chaff and grain mixture.

While I have found that the nozzles 21 serve very effectively for average hillside wheat-combining practices, it may be desired in some special instances to deflect portions of the flow in one manner or another. Accordingly, in Fig. 8, I have shown a transverse baffle 38 extending across the discharge orifice of the nozzle 21 between the upper and lower walls thereof at an angle to the horizontal which will depend upon the particular circumstances.

Whereas this invention is here illustrated and described with respect to certain preferred forms of apparatus, it is to be understood that various changes therein and various other structural arrangements may be made by those skilled in the art without departing from the scope of the claims which here follow.

I claim:

1. In combination with an agricultural combine equipped with reciprocating chaffer sieves having feed and discharge ends and with means disposed adjacent the feed end of said sieves for feeding mixed grain and chaff thereonto, a grain-saving device for hillside operation comprising a pair of nozzles disposed laterally of said sieves and spaced apart across the width thereof, said nozzles having respective elongate discharge orifices extending longitudinally with the longitudinal axis of said sieves and disposed wholly within the longitudinal extension of said sieves immediately adjacent said feed end thereof; means for forcing air into said nozzles and out the said discharge orifices thereof; and means for controlling passage of said air.

2. The combination recited in claim 1, wherein the air forcing means comprises a blower, a main conduit leading from said blower, and a pair of branch conduits leading from said main conduit to the respective nozzles, and wherein the air controlling means comprises a damper in each branch conduit, and pendulum actuating mechanism for each damper.

3. The combination recited in claim 2, wherein the nozzles are downwardly directed, and have inturned opposingly directed means defining the respective elongate discharge orifices; and wherein those portions of the branch conduits which interconnect with the main conduit lie in a common plane with said main conduit, and the continuation portions of said branch conduits extend substantially normal to said common plane.

4. A grain-saving attachment for agricultural combines, comprising a pair of oppositely disposed, downwardly directed, and mutually spaced air flow nozzles having inturned opposingly directed means defining respective elongate discharge orifices extending longitudinally in the same direction and facing each other; respective air flow conduits leading to said nozzles; a main air flow conduit from which the said respective air flow conduits branch, the latter having those portions thereof which interconnect with said main air flow conduit lying in a common plane therewith, and having continuation portions extending substantially normal to said common plane; blower means communicating with said main air flow conduit; a pair of dampers disposed within the said respective air flow conduits, for independently controlling relative air flow through said nozzles; and a pair of pendulums connected with the respective dampers of said pair of dampers for independently controlling the operations thereof in response to gravity.

5. The combination recited in claim 1, wherein the said discharge orifices of the nozzles are of rectangular configuration.

6. The combination recited in claim 1, wherein the said discharge orifices of the nozzles are of rectangular configuration, and have their lower defining walls lying substantially flush with the upper surface of the chaffer sieves.

7. The combination recited in claim 1, wherein each nozzle communicates with the interior of the combine housing through an opening in the corresponding side wall of the combine housing similar in size and configuration with the nozzle discharge orifice, through a similarly apertured seal plate secured to the inner wall of the said side wall of the combine housing so that its opening registers with the said side wall opening, and through a similar though longer opening in the corresponding side wall of the chaffer sieves, which longer opening registers with the other said openings except for length, when the chaffer sieves are at one end position of their reciprocatory stroke, and the length thereof exceeding the length of the said other openings by a distance substantially corresponding to the length of said reciprocatory stroke.

8. The combination recited in claim 3, wherein there is also included a shutoff valve in the main air flow conduit.

9. The combination recited in claim 3, wherein the air flow nozzles have rectangular discharge openings.

10. The combination recited in claim 3, wherein the air flow nozzles are provided with respective baffles extending longitudinally of their discharge openings.

References Cited in the file of this patent

UNITED STATES PATENTS

| | | |
|---|---|---|
| 2,310,610 | Bissell | Feb. 9, 1943 |
| 2,611,487 | Stevenson | Sept. 23, 1952 |
| 2,692,679 | Lindberg et al. | Oct. 26, 1954 |
| 2,694,493 | Odegarden | Nov. 16, 1954 |